United States Patent
Shang et al.

(10) Patent No.: US 8,712,196 B2
(45) Date of Patent: Apr. 29, 2014

(54) OPTICAL CABLE PLUG-IN DETECTION

(75) Inventors: Alain Zhi Shang, Tracy, CA (US); Chung-Yi Su, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 102 days.

(21) Appl. No.: 13/554,785

(22) Filed: Jul. 20, 2012

(65) Prior Publication Data

US 2014/0023312 A1  Jan. 23, 2014

(51) Int. Cl.
*G02B 6/00* (2006.01)
*G02B 6/12* (2006.01)

(52) U.S. Cl.
USPC ................................ 385/12; 385/14

(58) Field of Classification Search
USPC .............................. 385/12–16, 147
See application file for complete search history.

(56) References Cited

U.S. PATENT DOCUMENTS

| | | | | |
|---|---|---|---|---|
| 5,247,309 A * | 9/1993 | Reich | ............................. | 342/368 |
| 5,268,973 A * | 12/1993 | Jenevein | ......................... | 385/14 |
| 5,349,598 A * | 9/1994 | Ouchi et al. | ................ | 372/50.21 |
| 5,594,577 A * | 1/1997 | Majima et al. | ................... | 398/79 |
| 5,742,418 A * | 4/1998 | Mizutani et al. | .............. | 398/184 |
| 5,757,828 A * | 5/1998 | Ouchi | ............................. | 372/27 |
| 6,301,401 B1* | 10/2001 | La | .................................... | 385/14 |
| 7,306,378 B2* | 12/2007 | Alduino et al. | ................... | 385/88 |
| 7,499,616 B2 | 3/2009 | Aronson et al. | | |
| 7,805,078 B1* | 9/2010 | Gerszberg et al. | ............ | 398/115 |
| 7,876,989 B2 | 1/2011 | Aronson et al. | | |
| 8,083,417 B2 | 12/2011 | Aronson et al. | | |
| 8,275,268 B2* | 9/2012 | Kazutaka | ....................... | 398/173 |
| 2004/0126053 A1* | 7/2004 | Ouchi | .............................. | 385/14 |
| 2010/0150552 A1 | 6/2010 | Furuyama | | |
| 2011/0013905 A1 | 1/2011 | Wang et al. | | |
| 2012/0140654 A1* | 6/2012 | Pak et al. | ....................... | 370/252 |

* cited by examiner

*Primary Examiner* — Akm Enayet Ullah

(57) ABSTRACT

An optical cable system includes switching circuitry, a resistance network, optical-to-electrical conversion circuitry, and electrical-to-optical conversion circuitry. The electrical-to-optical conversion circuitry can convert an electrical transmit signal into an optical transmit signal. When the optical-to-electrical conversion circuitry detects a received optical signal having an optical power exceeding a threshold, the optical-to-electrical conversion circuitry produces a switching signal that causes the switching circuitry to couple the resistance network to a terminal or other node associated with the electrical transmit signal, thereby changing the impedance at that node as perceived by plug-in detection circuitry of a device such as a computer or peripheral.

15 Claims, 5 Drawing Sheets

OPTICAL CABLE PLUG-IN DETECTION

BACKGROUND

Plug-in detection is a feature commonly included in computer systems and data communications systems, in which a host computer or similar device is capable of detecting whether the far end of a data communications cable is plugged in to a peripheral or similar device. In some types of data communications systems, the host device only begins transmitting data over a cable in response to it detecting that the far end of the cable has been plugged in to an appropriate peripheral device.

Plug-in detection systems commonly detect whether a cable having a copper conductor has been plugged in by sensing the impedance presented to the host device via the cable. When the electrical connector at the far end of the cable is not plugged in to a peripheral device, a higher impedance is presented to the host device via the cable than when the electrical connector is plugged in to the peripheral device. The plug-in detection system in the host device commonly includes a charging resistor and a coupling capacitor that, in conjunction with the above-referenced impedance, forms a resistor-capacitor (R-C) circuit that the plug-in detection system can cause to charge and discharge. The R-C time constant is slower when the cable is plugged in to a peripheral device than when the cable is not plugged in to the peripheral device. Additional circuitry in the plug-in detection system can sense a change in this time constant. When the plug-in detection system senses that this R-C time constant has decreased below a threshold, the plug-in detection system outputs a signal indicating that the cable has been plugged in. Other circuitry in the host device may respond to this plug-in detection signal by initiating tasks such as transmitting data via the cable.

The above-described type of plug-in detection system is operable with cables having copper signal conductors. It is not readily adaptable to cables that carry signals over optical fibers.

An active optical cable (AOC) is a data communications cable having electrical connectors and electrical-to-optical and optical-to-electrical converters at its ends (typically within housings that serve as the cable plugs), with optical fibers extending between those converters. Thus, an electrical signal received at a first electrical connector at one end of the AOC is converted into an optical signal, conveyed through the optical fiber, converted back to an electrical signal, and provided to a second electrical connector at the other end of the AOC. Some AOCs are bidirectional and include both an electrical-to-optical and an optical-to-electrical converter at each end of the AOC, with a first optical fiber carrying signals in one direction and a second optical fiber carrying signals in the opposite direction.

SUMMARY

Embodiments of the present invention relate to an optical cable system, such as an active optical cable (AOC) having plug-in detection, and to a method of operation that includes plug-in detection.

In an exemplary or illustrative embodiment, the optical cable system comprises an AOC that includes a first optical fiber, a second optical fiber, a first mateable electrical connector, first switching circuitry, a first resistance network, first optical-to-electrical signal conversion circuitry, and first electrical-to-optical signal conversion circuitry. The first switching circuitry is configured to switch a first signal associated with a first electrical transmit signal that is received via the first mateable electrical connector. The first resistance network comprises at least one resistor coupled to the first switching circuitry and to a fixed voltage level, such as ground. The first resistance network contributes to an impedance that is presented at a terminal of the first mateable electrical connector associated with the first electrical transmit signal. The first optical-to-electrical signal conversion circuitry is configured to detect and convert a first optical receive signal received via the second optical fiber into a first electrical receive signal. The first optical-to-electrical signal conversion circuitry is also configured to provide the first electrical receive signal to the first mateable electrical connector. The first optical-to-electrical conversion circuitry is further configured to produce a first switching signal in response to detecting the optical receive signal. The first switching circuitry thus switches the above-referenced impedance in response to the first switching signal. The first electrical-to-optical signal conversion circuitry has an input coupled to the first resistance network and is configured to convert the first electrical transmit signal into a first optical transmit signal and to provide the first optical transmit signal to the first optical fiber.

In embodiments of a method of operation of the optical cable system, the first electrical-to-optical signal conversion circuitry converts the first electrical transmit signal that is received via the first mateable electrical connector into a first optical transmit signal and provides the first optical transmit signal to the first optical fiber. The first optical-to-electrical signal conversion circuitry detects and converts the first optical receive signal that is received via the second optical fiber into a first electrical receive signal, and provides the first electrical receive signal to the first mateable electrical connector. The first optical-to-electrical signal conversion circuitry further generates a first switching signal in response to detecting the first optical receive signal. The first switching circuitry switches a first signal associated with the first electrical transmit signal in response to the first switching signal. The first resistance network contributes an impedance that is presented at a terminal of the first mateable electrical connector associated with the first electrical transmit signal. Thus, the impedance switches in response to switching of the first switching circuitry.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
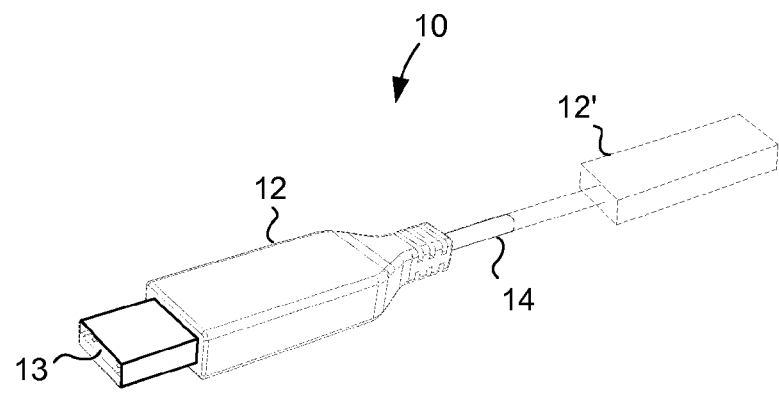
FIG. 1 is a perspective view of one end of an active optical cable (AOC) in accordance with an exemplary embodiment of the present invention.
Figure 2:
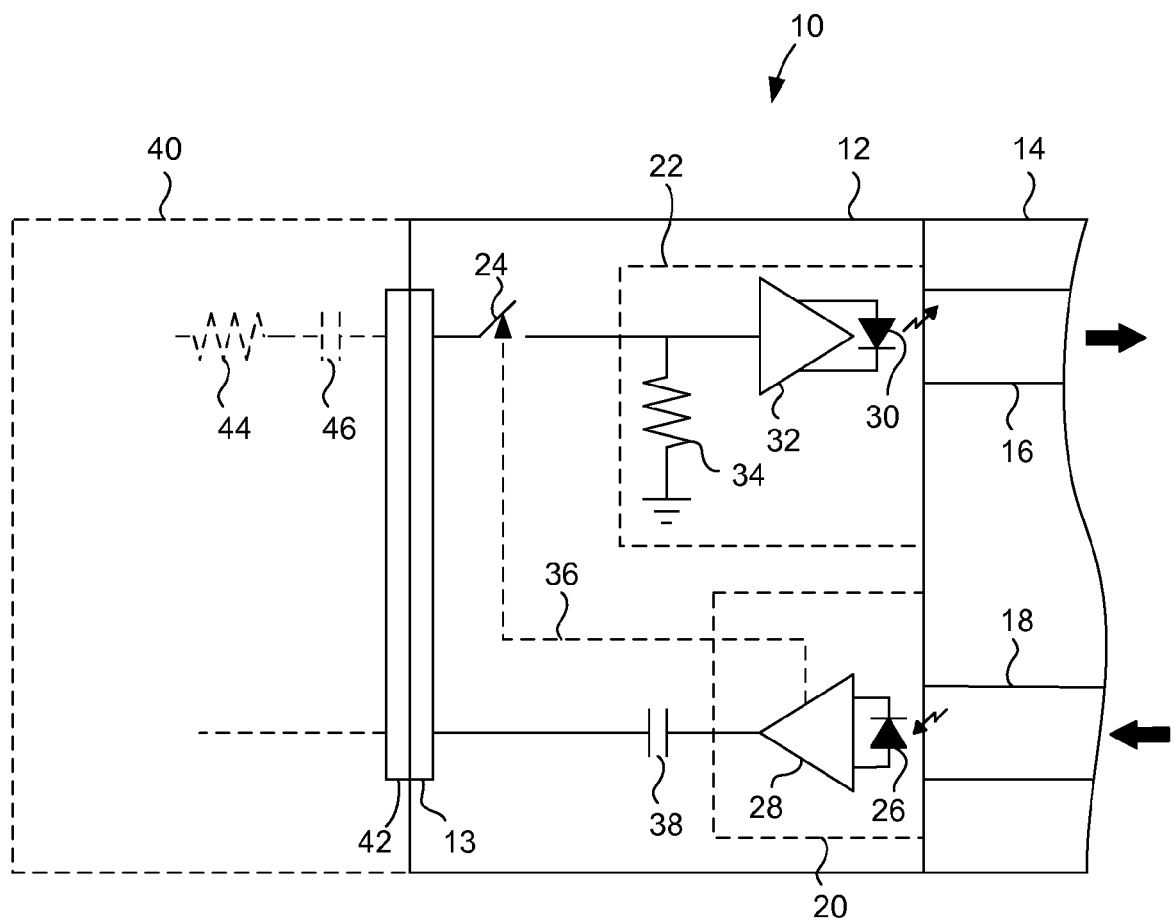
FIG. 2 is a schematic diagram of the end of the exemplary AOC shown in FIG. 1.
Figure 3:
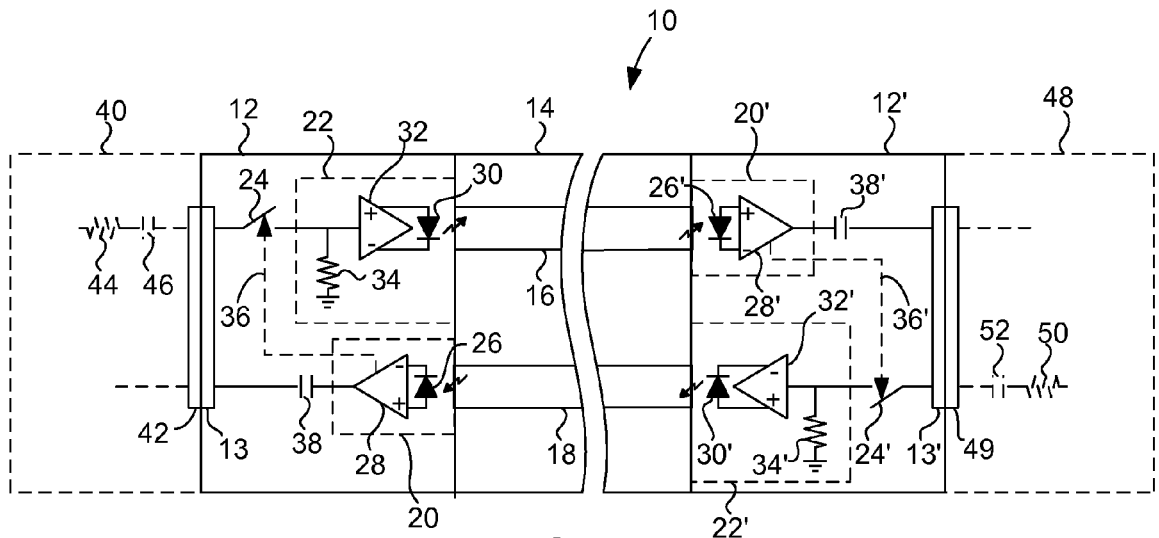
FIG. 3 is a schematic diagram of the exemplary AOC, showing both ends and the optical fibers therebetween.

As illustrated in FIGS. 1-3, in an illustrative or exemplary embodiment of the invention, an optical cable (AOC) system comprises an AOC 10 having a plug 12 in which the electronic and opto-electronic elements described below are housed. Nevertheless, in other embodiments a separate housing that is not part of the plug or other connector can be included for such elements. For example, in embodiments described below in which the optical cable system does not comprise an AOC, the electronic and opto-electronic elements described below can be housed within a device such as a computer or peripheral device, the front panel of which can be mated with a passive (fiber-only) optical cable. In the embodiment illustrated in FIGS. 1-3, however, such a cable 14 extends between a proximal end of plug 12 and the proximal end of another plug 12' that can be identical to plug 12, including the elements housed within it. The exemplary plug 12 in FIG. 1 is depicted as having a configuration conforming to the Universal Serial Bus (USB) standard, but in other embodiments the plug or other connector can have any other configuration, such as, for example, PCIe. Although not individually depicted for purposes of clarity, an array of electrical contacts 13 is housed (FIG. 1) within the distal end of plug 12 and can make electrical contact with mating contacts within a USB receptacle (not shown) of a device such as a computer, peripheral device, or other device. It should also be noted that although in the exemplary embodiment the connector has a plug-like configuration so that it can be plugged into a mating USB receptacle of a computer, peripheral device, or other device, in other embodiments the connector can have any other mating configuration (e.g., male, female, plug, receptacle, etc.).

As illustrated in FIG. 2, cable 14 includes a first optical fiber 16 and a second optical fiber 18, which thus extend between plugs 12 and 12' (not shown in FIG. 2). First optical fiber 16 and a second optical fiber 18 can be protected by an outer jacket or sheath of cable 14. Optical-to-electrical conversion circuitry 20, electrical-to-optical conversion circuitry 22, and switching circuitry 24 are included in plug 12. Optical-to-electrical conversion circuitry 20 includes an opto-electronic detector, such as a photodiode 26, as well as detection and conversion circuitry 28. Electrical-to-optical conversion circuitry 22 includes an opto-electronic source, such as a laser 30, as well as driver circuitry 32. In the embodiment illustrated in FIG. 2, electrical-to-optical conversion circuitry 22 also includes a resistor 34 having a first terminal connected to the signal input of driver circuitry 32 and a second terminal connected to a ground potential or zero voltage level. A first terminal of switching circuitry 24 is connected to one of electrical contacts 13 in plug 12 that carries an electrical transmit signal. A second terminal of switching circuitry 24 is connected to the signal input of driver circuitry 32. Switching circuitry 24 can comprise, for example, a switch implemented by a multiplexer/demultiplexer having one of its inputs in a high-impedance state (i.e., open). Persons skilled in the art can appreciate that switching circuitry 24 can be embodied or implemented in various other ways.

Note that, when switched to a closed state, switching circuitry 24 couples the one of electrical contacts 13 that carries the electrical transmit signal to the signal input of driver circuitry 32. Also note that when switching circuitry 24 is in such a closed state, resistor 34 contributes to an impedance presented at the one of electrical contacts 13 that carries the electrical transmit signal. Although in the illustrated embodiment a single resistor 34 contributes to this impedance, in other embodiments a resistance network having any number and arrangement of resistors can contribute to the impedance.

Switching circuitry 24 operates in response to a switching signal 36. Optical-to-electrical conversion circuitry 20 produces switching signal 36 in response to detecting an optical receive signal that it receives through second optical fiber 18. That is, optical-to-electrical conversion circuitry 20 activates switching signal 36 when it determines that the optical power impinging upon photodiode 26 has increased above a predetermined threshold. Switching circuitry 24 responds to activation of switching signal 36 by switching to the above-referenced closed state.

Another output of optical-to-electrical conversion circuitry 20 is an electrical receive signal representing the result of the conversion of the optical receive signal. The electrical receive signal is coupled to one of electrical contacts 13 via a coupling capacitor 38. When plug 12 is connected to the mating connector of external device 40, electrical signals are coupled between electrical contacts 13 of plug 12 and corresponding electrical contacts 42 of external device 40. Thus, when plug 12 is connected to a mating connector of an external device 40, external device 40 can receive the electrical receive signal via electrical contacts 42 of the mating connector.

When plug 12 is connected to a mating connector of an external device 40, plug 12 can also receive the above-referenced electrical transmit signal from external device 40. When switching circuitry 24 is in the closed state, electrical-to-optical conversion circuitry 22 converts the electrical transmit signal into an optical transmit signal and couples the optical transmit signal to first optical fiber 16.

External device 40 includes plug-in detection circuitry that can detect a change in impedance at the one of electrical contacts 42 carrying the electrical transmit signal. The manner in which such an external device 40 can detect such a change in impedance is well understood. However, it can be noted that such plug-in detection circuitry commonly includes a resistor 44 and a coupling capacitor 46, which, when coupled to resistor 34 via switching circuitry 24, form a resistor-capacitor (R-C) circuit. External device 40 can detect a change in the time constant of this R-C circuit resulting from the closure of switching circuitry 24. External devices 40 having such a plug-in detection feature are well known and include, for example, computers having USB ports. Electrical contacts 42 can be, for example, those of a computer USB port (connector).

As illustrated in FIG. 3, AOC 10 can be connected between external device 40 and another external device 48, which can be, for example, a computer peripheral device. External device 48 includes electrical contacts 49, which can be, for example, those of a peripheral device USB port (connector). When plug 12' is connected to the mating connector of external device 48, electrical signals are coupled between electrical contacts 13' of plug 12' and corresponding electrical contacts 49 of external device 48. Plugging plug 12' into external device 48 causes power to be applied to electrical-to-optical conversion circuitry 22' via some of the electrical contacts 49. In response to this application of power, electrical-to-optical conversion circuitry 22' immediately or automatically (i.e., without requiring any other input for activation) emits an optical signal, which propagates through second optical fiber 18 and thus defines the above-referenced optical receive signal at plug 12. The optical power of the optical receive signal that results from powering-on of electrical-to-optical conversion circuitry 22' generally exceeds the above-referenced threshold. As described above, optical-to-electrical conversion circuitry 20 activates switching signal 36 when the optical power of the optical receive signal exceeds this threshold. In the manner described above, switching circuitry 24 switches the above-referenced impedance in response to the activation of switching signal 36. Detection of the resulting impedance change by the plug-in detection circuitry of external device 40 indicates that plug 12' has been plugged in.

Note that electrical-to-optical conversion circuitry 22' can be identical to electrical-to-optical conversion circuitry 22; optical-to-electrical conversion circuitry 20' can be identical to optical-to-electrical conversion circuitry 20; and switching circuitry 24' can be identical to switching circuitry 24. Accordingly, photodiode 26' can be identical to photodiode 26; detection and conversion circuitry 28' can be identical to detection and conversion circuitry 28; laser 30' can be identical to laser 30; driver circuitry 32' can be identical to driver circuitry 32; and resistor 34' can be identical to resistor 34. Likewise, coupling capacitor 38' can be identical to coupling capacitor 38. Switching circuitry 24' can switch in response to switching signal 36' in the same manner that switching circuitry 24 switches in response to switching signal 36. External device 48 can include plug-in detection circuitry similar to that described above with regard to external device 40. Accordingly, external device 48 can include a resistor 50 and a capacitor 52.

Figure 4:
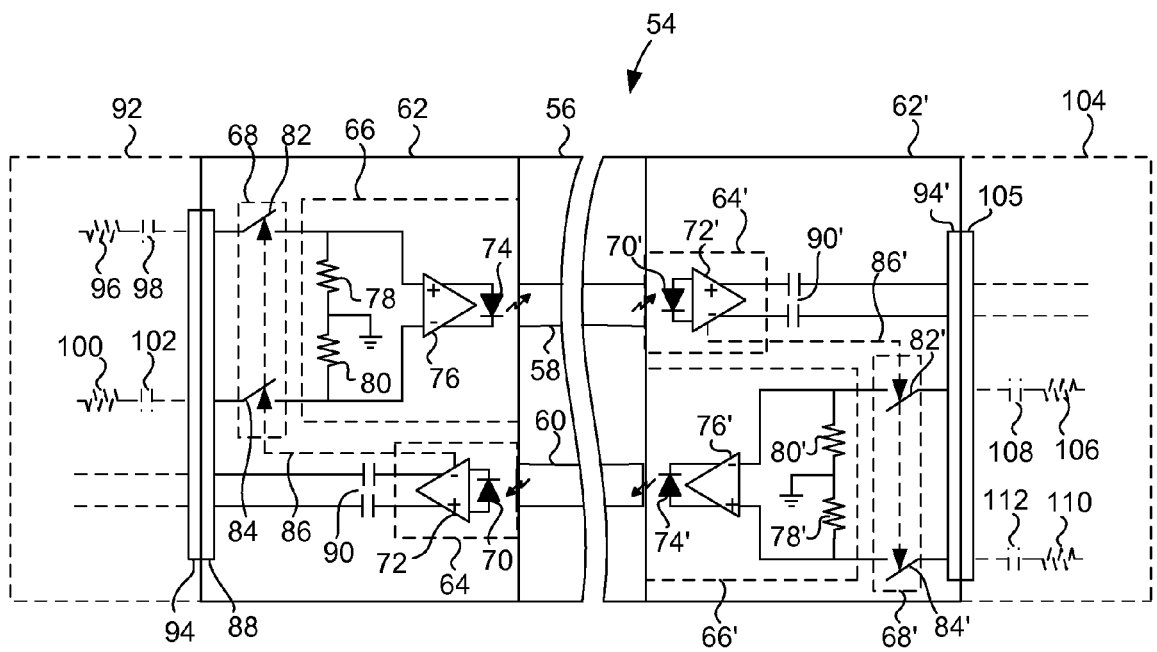
FIG. 4 is similar to FIG. 3, showing another embodiment of an AOC having a differential, internally terminated configuration.

As illustrated in FIG. 4, in another embodiment, the electrical transmit and receive signals can be differential, rather than single-ended as in the embodiment described above with regard to FIGS. 1-3. Accordingly, in the embodiment illustrated in FIG. 4 the differential electrical receive signal comprises a positive electrical receive signal and a negative electrical receive signal. Likewise, the differential electrical transmit signal comprises a positive electrical transmit signal and a negative electrical transmit signal. Unless stated otherwise with regard to a specific element, elements in this embodiment operate in essentially the same manner as the corresponding elements in the embodiment described above with regard to FIGS. 1-3. Accordingly, such operation is not described again below with regard to this embodiment.

In the embodiment illustrated in FIG. 4, the AOC 54 includes a cable 56 having a first optical fiber 58 and a second optical fiber 60 and extending between two plugs 62 and 62'. Plugs 62 and 62' can have, for example, the same configuration described above with regard to the embodiment shown in FIGS. 1-3. Plug 62 includes optical-to-electrical conversion circuitry 64, electrical-to-optical conversion circuitry 66, and switching circuitry 68. Optical-to-electrical conversion circuitry 64 includes an opto-electronic detector, such as a photodiode 70, as well as detection and conversion circuitry 72. Electrical-to-optical conversion circuitry 66 includes an opto-electronic source, such as a laser 74, as well as driver circuitry 76. In the embodiment illustrated in FIG. 4, electrical-to-optical conversion circuitry 66 also includes a first resistor 78 and a second resistor 80, which together define a resistance network. Switching circuitry 68 can be implemented by, for example, a multiplexer/demultiplexer having inputs in a high-impedance state (i.e., open).

A first terminal of first resistor 78 is coupled to the positive input of electrical-to-optical conversion circuitry 66 and to a first switch 82 of switching circuitry 68. A second terminal of first resistor 78 is coupled to the ground voltage level. A first terminal of second resistor 80 is coupled to the negative input of electrical-to-optical conversion circuitry 66 and to a second switch 84 of switching circuitry 68. A second terminal of second resistor 80 is coupled to the ground voltage level.

Switching circuitry 68 operates in response to a switching signal 86. Optical-to-electrical conversion circuitry 64 produces switching signal 86 in response to detecting an optical receive signal that it receives through second optical fiber 60. That is, optical-to-electrical conversion circuitry 64 activates switching signal 86 when it determines that the optical power impinging upon photodiode 70 has increased above a predetermined threshold. Switching circuitry 68 responds to activation of switching signal 86 by switching to a closed state.

Another output of optical-to-electrical conversion circuitry 64 is the differential electrical receive signal (i.e., the positive electrical receive signal and the negative electrical receive signal) representing the result of the conversion of the optical receive signal. The differential electrical receive signal is coupled to a contact pair of the electrical contacts 88 via a corresponding pair of coupling capacitors 90. When plug 62 is connected to the mating connector of external device 92, electrical signals are coupled between electrical contacts 88 of plug 62 and corresponding electrical contacts 94 of external device 92. Thus, when plug 62 is connected to a mating connector of an external device 92, external device 92 can receive the differential electrical receive signal.

Also, when plug 62 is connected to a mating connector of external device 92, plug 62 can receive the above-referenced differential electrical transmit signal from external device 40. When switching circuitry 68 is in a closed state, electrical-to-optical conversion circuitry 66 converts the electrical transmit signal into an optical transmit signal and couples the optical transmit signal to first optical fiber 58. External device 92 can have a structure that is essentially the same as external device 40, described above with regard to FIGS. 2-3, except that external device 92 communicates differential signals through its electrical contacts 94 rather than single-ended signals. Accordingly, the plug-in detection circuitry of external device 92 can include a resistor 96 and a coupling capacitor 98 coupled to the positive electrical transmit signal and another resistor 100 and another coupling capacitor 102 coupled to the negative electrical transmit signal.

In the embodiment illustrated in FIG. 4, AOC 54 can include another plug 62' that can be plugged into another external device 104. External device 104 includes electrical contacts 105, which can be, for example, those of a peripheral device USB port (connector). When plug 62' is connected to the mating connector of external device 104, electrical signals are coupled between electrical contacts 94' of plug 22' and corresponding electrical contacts 105 of external device 104. Plugging plug 62' into external device 104 also causes power to be applied to electrical-to-optical conversion circuitry 66' via some of electrical contacts 105. In response to this application of power, electrical-to-optical conversion circuitry 66' immediately or automatically (i.e., without requiring any other input for activation) emits an optical signal, which is carried through second optical fiber 60 and received at plug 62 as the optical receive signal. Optical-to-electrical conversion circuitry 64 activates switching signal 86 when the optical power of the optical receive signal exceeds a predetermined threshold. When switching circuitry 24 switches to a closed state in response to activation of switching signal 86, the resistance network comprising resistors 78 and 80 contributes to an impedance presented at the pair of electrical contacts 88 that carries the differential electrical transmit signal. Detection of the resulting impedance change by the plug-in detection circuitry of external device 92 indicates that plug 62' has been plugged in.

Note that electrical-to-optical conversion circuitry 66' can be identical to electrical-to-optical conversion circuitry 66; optical-to-electrical conversion circuitry 64' can be identical to optical-to-electrical conversion circuitry 64; and switching circuitry 68', including switches 82' and 84', can be identical to switching circuitry 24 and its switches 82 and 84. Accordingly, photodiode 70' can be identical to photodiode 70; detection and conversion circuitry 72' can be identical to detection and conversion circuitry 72; laser 74' can be identical to laser 74; driver circuitry 76' can be identical to driver circuitry 76; and resistors 78' and 80' can be identical to resistors 78 and 80. Likewise, coupling capacitors 90' can be identical to coupling capacitors 90. Switching circuitry 68' can switch in response to switching signal 86' in the same manner that switching circuitry 68 switches in response to switching signal 86. External device 104 can include plug-in detection circuitry similar to that described above with regard to external device 92. Accordingly, external device 104 can include a resistor 106, a capacitor 108, another resistor 110 and another capacitor 112.

Figure 5:
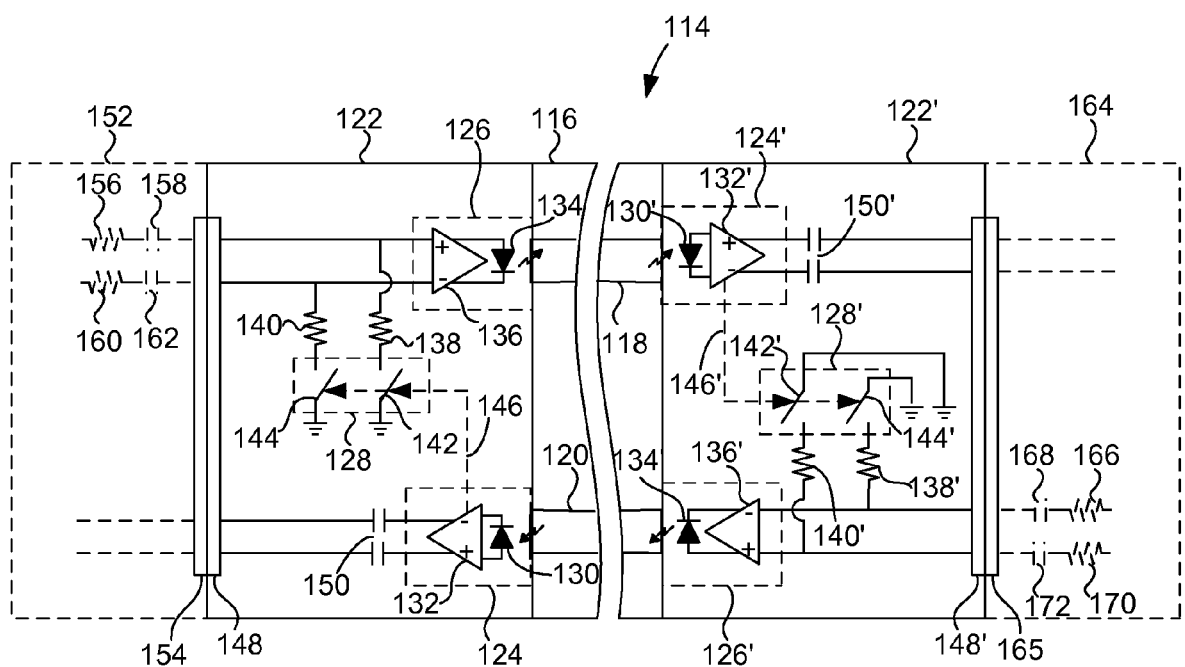
FIG. 5 is similar to FIG. 4, showing still another embodiment of an AOC having a differential, externally terminated configuration.

As illustrated in FIG. 5, in still another embodiment, the electrical transmit and receive signals are differential as in the embodiment described above with regard to FIG. 4, but the resistance network is different. Note that in the embodiments described above with regard to FIGS. 1-4, the termination defined by the resistance networks is internal to, or included in, electrical-to-optical conversion circuitry 22 and 66, whereas in this embodiment the termination is external to such elements. Unless stated otherwise with regard to a specific element, elements in this embodiment operate in essentially the same manner as the corresponding elements in the embodiments described above with regard to FIGS. 1-4.

In the embodiment illustrated in FIG. 5, the AOC 114 includes a cable 116 having a first optical fiber 118 and a second optical fiber 120 and extending between two plugs 122 and 122'. Plugs 122 and 122' can have, for example, the same configuration described above with regard to the embodiments shown in FIGS. 1-4. Plug 122 includes optical-to-electrical conversion circuitry 124, electrical-to-optical conversion circuitry 126, and switching circuitry 128. Optical-to-electrical conversion circuitry 124 includes an optoelectronic detector, such as a photodiode 130, as well as detection and conversion circuitry 132. Electrical-to-optical conversion circuitry 126 includes an opto-electronic source, such as a laser 134, as well as driver circuitry 136. The resistance network is defined by a first resistor 138 and a second resistor 140. Switching circuitry 128 can be implemented by, for example, a multiplexer/demultiplexer having inputs in a high-impedance state (i.e., open).

A first terminal of first resistor 138 is coupled to the positive input of the electrical-to-optical conversion circuitry 126. The second terminal of first resistor 138 is coupled to a first switch 142 of switching circuitry 128. The first terminal of second resistor 140 is coupled to the negative input of electrical-to-optical conversion circuitry 126. The second terminal of second resistor 140 is coupled to a second switch 144 of switching circuitry 128. It should be noted that although both switches 142 and 144 are included in the exemplary embodiment for purposes of illustration, other embodiments can have only one switch or the other (but not both). That is, an embodiment similar to that shown in FIG. 5 would be operable with switching circuitry having only a single switch.

Switching circuitry 128 operates in response to a switching signal 146. Optical-to-electrical conversion circuitry 124 produces switching signal 146 in response to detecting an optical receive signal that it receives through second optical fiber 120. That is, optical-to-electrical conversion circuitry 124 activates switching signal 146 when it determines that the optical power impinging upon photodiode 130 has increased above a predetermined threshold. Switching circuitry 128 responds to activation of switching signal 146 by switching to a closed state.

Another output of optical-to-electrical conversion circuitry 124 is the differential electrical receive signal (i.e., a positive electrical receive signal and a negative electrical receive signal) representing the result of the conversion of the optical receive signal. The differential electrical receive signal is coupled to a contact pair of the electrical contacts 148 via a corresponding pair of coupling capacitors 150. When plug 122 is connected to the mating connector of external device 152, electrical signals are coupled between electrical contacts 148 of plug 122 and corresponding electrical contacts 154 of external device 152. Thus, when plug 122 is connected to a mating connector of an external device 152, external device 152 can receive the differential electrical receive signal via electrical contacts 154 of the mating connector.

Also, when plug 152 is connected to a mating connector of external device 152, plug 122 can receive the above-referenced differential electrical transmit signal from external device 152. Electrical-to-optical conversion circuitry 126 converts the differential electrical transmit signal into an optical transmit signal and couples the optical transmit signal to first optical fiber 118. External device 152 can have a structure that is essentially the same as external device 92, described above with regard to FIG. 4. Accordingly, the plug-in detection circuitry of external device 152 can include a resistor 156 and a coupling capacitor 158 coupled to the positive electrical transmit signal and another resistor 160 and another coupling capacitor 162 coupled to the negative electrical transmit signal.

In the embodiment illustrated in FIG. 5, AOC 114 can include another plug 122' that can be plugged into another external device 164. External device 164 includes electrical contacts 165, which can be, for example, those of a peripheral device USB port (connector). When plug 122' is connected to the mating connector of external device 164, electrical signals are coupled between electrical contacts 148' of plug 122' and corresponding electrical contacts 165 of external device 164. Plugging plug 122' into external device 164 also causes power to be applied to electrical-to-optical conversion circuitry 126' via some of electrical contacts 165. In response to this application of power, electrical-to-optical conversion circuitry 126' immediately or automatically (i.e., without requiring any other input for activation) emits an optical signal, which is carried through second optical fiber 120 and received at plug 122 as the optical receive signal. Optical-to-electrical conversion circuitry 124 activates switching signal 146 when the optical power of the optical receive signal exceeds a predetermined threshold. When switching circuitry 128 switches to a closed state in response to activation of switching signal 146, the resistance network comprising resistors 138 and 140 contributes to an impedance presented at the pair of electrical contacts 148 that carries the differential electrical transmit signal. Detection of the resulting impedance change by the plug-in detection circuitry of external device 152 indicates that plug 122' has been plugged in.

Note that electrical-to-optical conversion circuitry 126' can be identical to electrical-to-optical conversion circuitry 126; optical-to-electrical conversion circuitry 124' can be identical to optical-to-electrical conversion circuitry 124; and switching circuitry 128', including switches 142' and 144', can be identical to switching circuitry 128 and its switches 142 and 144. Accordingly, photodiode 130' can be identical to photodiode 130; detection and conversion circuitry 132' can be identical to detection and conversion circuitry 132; laser 134' can be identical to laser 134; driver circuitry 136' can be identical to driver circuitry 136; and resistors 138' and 140' can be identical to resistors 138 and 140. Likewise, coupling capacitors 150' can be identical to coupling capacitors 150. Switching circuitry 128' can switch in response to switching signal 146' in the same manner that switching circuitry 128 switches in response to switching signal 146. External device 164 can include plug-in detection circuitry similar to that described above with regard to external device 152. Accordingly, external device 164 can include a resistor 166, a capacitor 168, another resistor 170 and another capacitor 172.

Figure 6:
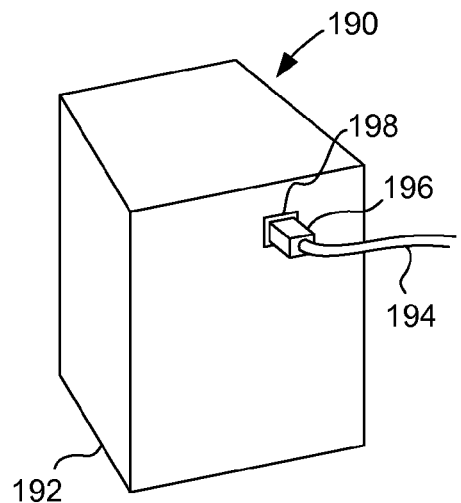
FIG. 6 is a perspective view of a computer having an optical cable system in accordance with yet another exemplary embodiment.

As illustrated in FIG. 6, in another embodiment the electronic elements of an optical cable system are included in a computer 190 housed within an enclosure 192. An optical cable 194 has an optical plug 196 that can be plugged into a receptacle 198 on enclosure 192.

Figure 7:
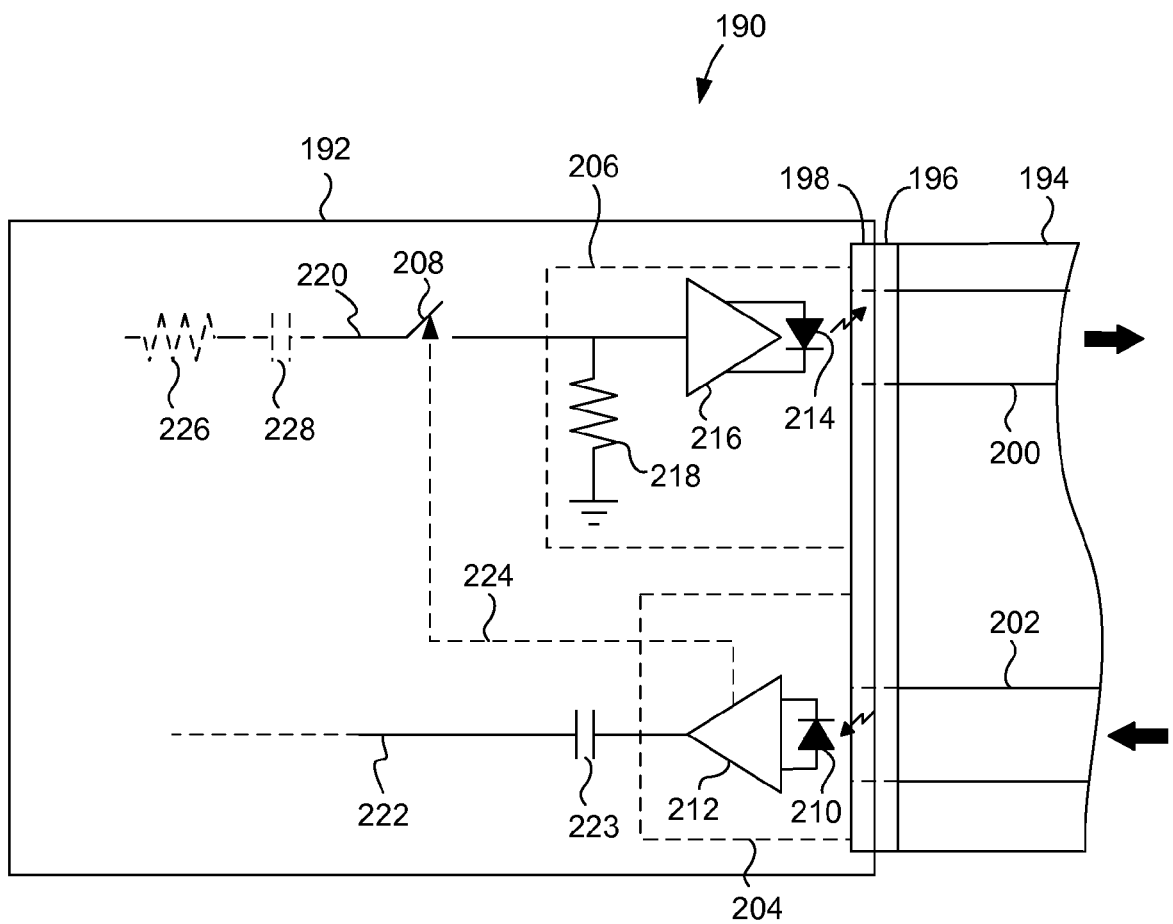
FIG. 7 is a schematic diagram of the exemplary optical cable system of FIG. 6.

As illustrated in FIG. 7, optical cable 194 includes a first optical fiber 200 and a second optical fiber 202. Relevant electronic elements housed within enclosure 192 are similar to those described above with regard to FIG. 2 and include optical-to-electrical conversion circuitry 204, electrical-to-optical conversion circuitry 206, and switching circuitry 208. Other circuitry of computer 190 housed within enclosure 192 that is not relevant to the optical cable system is not shown in FIG. 7 for purposes of clarity, but as persons skilled in the art understand, such circuitry includes at least processing circuitry (e.g., a processor, memory, etc.) and data communication circuitry, and can include any other circuitry commonly included in a computer.

Optical-to-electrical conversion circuitry 204 includes an opto-electronic detector, such as a photodiode 210, as well as detection and conversion circuitry 212. Electrical-to-optical conversion circuitry 206 includes an opto-electronic source, such as a laser 214, as well as driver circuitry 216. A resistor 218 has a first terminal connected to the signal input of driver circuitry 216 and a second terminal connected to a ground potential or zero voltage level. A first terminal of switching circuitry 208 is connected to a circuit node or connection 220 that carries the electrical transmit signal provided by data communication circuitry (not shown) of computer 190. A second terminal of switching circuitry 208 is connected to the signal input of driver circuitry 216.

The electrical receive signal is coupled to a circuit node or connection 222 via a coupling capacitor 223 for reception by the above-referenced data communication circuitry (not shown) of computer 190. Optical-to-electrical conversion circuitry 204 produces the electrical receive signal by converting the optical receive signal that it receives through second optical fiber 202. Optical-to-electrical conversion circuitry also activates the switching signal 224 in response to detecting an optical receive signal that it receives through second optical fiber 202. That is, optical-to-electrical conversion circuitry 204 activates switching signal 224 when it determines that the optical power impinging upon photodiode 210 has increased above a predetermined threshold. Switching circuitry 208 responds to activation of switching signal 36 by switching to a closed state.

When the far end (not shown) of optical cable 194 is plugged into an external device, the optical receive signal causes switching circuitry 208 to switch to the closed state, thereby changing the impedance presented to the plug-in detection circuitry of computer 190. The plug-in detection circuitry of computer 190 includes a resistor 226 and a capacitor 228 and operates in the same manner as described above with regard to other embodiments. Detecting a change in impedance, indicating that the far end of optical cable 194 has been plugged in, can trigger computer 190 to initiate other tasks, such as transmitting data. The data communication circuitry (not shown) of computer 190 provides such data in the form of the electrical transmit signal at node or connection 220. With switching circuitry 208 in the closed state, electrical-to-optical conversion circuitry 206 can convert the electrical transmit signal into an optical transmit signal and couple the optical transmit signal to first optical fiber 200.

Although the circuit configuration of the exemplary optical cable system 190 of the computer in FIGS. 6-7 is similar to the circuit configuration of the optical cable system of the AOC shown in FIG. 2, in still other embodiments (not shown) an optical cable system of a computer, peripheral or other enclosed device alternatively can be similar to the circuit configurations of the optical cable systems of the AOCs shown in FIGS. 4 and 5.

Figure 8:
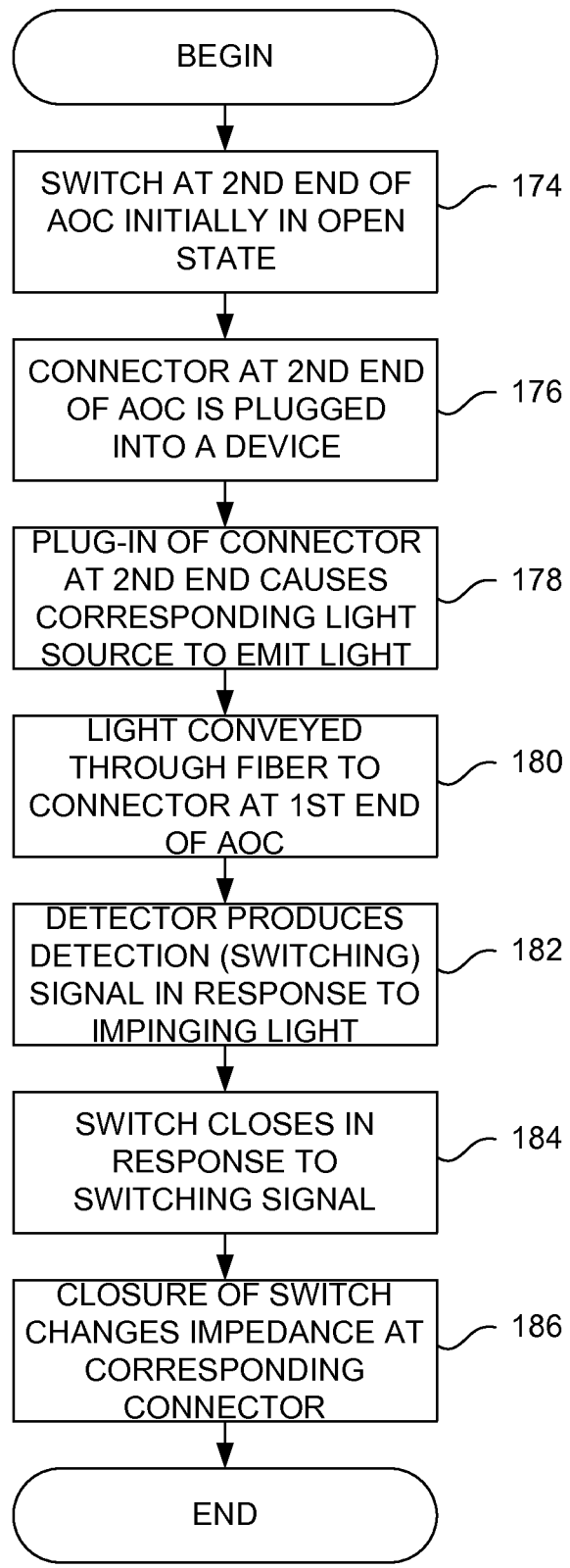
FIG. 8 is a flow diagram illustrating a method of operation of the system of FIG. 1, in accordance with an exemplary embodiment of the invention.

As illustrated in FIG. 8, an exemplary method of operation of the above-described AOCs begins with a first connector (e.g., a plug) at a first end of the AOC connected to a first external device (e.g., a computer) and a second connector at a second end of the AOC disconnected from any external devices. Accordingly, the switching circuitry in the first connector is initially in an open state, as indicated by block 174. As indicated by block 176, a user may plug the second connector at the second end of the AOC into a second external device (e.g., a computer peripheral).

As indicated by block 178, the plug-in of the second connector applies power to the electrical-to-optical conversion circuitry in the second connector, causing the associated laser or similar light source to emit light. As indicated by block 180, this light is conducted through one of the optical fibers to the first end of the AOC. As indicated by block 182, the light impinges upon the photodiode or similar optical detector of the optical-to-electrical conversion circuitry in the first connector, causing it to activate a switching signal. As indicated by block 184, in response to activation of the switching signal, the switching circuitry in the first connector switches to a closed state.

As indicated by block 186, the closure of the switching circuitry switches the impedance presented at a contact terminal of the first connector that carries the electrical transmit signal, i.e., the signal that is input to the electrical-to-optical conversion circuitry in the first connector. The impedance is switched because the closure of the switching circuitry couples the resistance network to the contact terminal of the first connector that carries the electrical transmit signal, and the resistance network contributes to the impedance experienced by the computer or other external device into which the first connector is plugged.

As described above, the computer or other external device can detect the change in impedance. The detection of such an impedance change can indicate to the computer or other external device that the second connector of the AOC has been plugged into a computer peripheral or other external device. The computer can then initiate any of various tasks in response to detecting the plug-in of the second connector, such as beginning to transmit signals via the AOC to the other external device.

It should be noted that although some process steps are described above as occurring after others in the exemplary embodiment, in other embodiments process steps can occur in any other suitable order. Also, additional process steps or sub-steps that are not described above can be included, as understood by persons skilled in the art.

One or more illustrative or exemplary embodiments of the invention have been described above. However, it is to be understood that the invention is defined by the appended claims and is not limited to the specific embodiments described.

What is claimed is:

1. An optical cable system, comprising:
   first switching circuitry configured to switch a first signal associated with a first electrical transmit signal;
   a first resistance network comprising at least one resistor coupled to the first switching circuitry and to a fixed voltage level, the first resistance network contributing to an impedance presented at a node associated with the first electrical transmit signal, the first switching circuitry switching the impedance in response to a first switching signal;
   first optical-to-electrical signal conversion circuitry configured to detect and convert a first optical receive signal into a first electrical receive signal, configured to provide the first electrical receive signal to the first mateable electrical connector, and configured to produce the first switching signal in response to detecting the optical receive signal; and
   first electrical-to-optical signal conversion circuitry having an input coupled to the first resistance network, the first electrical-to-optical signal conversion circuitry configured to convert the first electrical transmit signal into a first optical transmit signal.

2. The optical cable system of claim 1, further comprising a plug-like connector housing, a first optical fiber configured to convey the first optical transmit signal, a second optical fiber configured to convey the first optical receive signal, and a first mateable electrical connector configured to provide the first electrical transmit signal, wherein the first switching circuitry, the first optical signal detector and the first optical signal source are contained within the plug-like connector housing, and the first mateable electrical connector is at least partly contained within the plug-like connector housing, and wherein the first optical fiber and the second optical fiber are contained within a cable jacket extending from the plug-like connector housing, and wherein the impedance is presented at a terminal of the first mateable electrical connector associated with the first electrical transmit signal.

3. The optical cable system of claim 1, wherein:
   the first resistance network has a first terminal coupled to the input of the first optical signal source and to the first switching circuitry and a second terminal coupled to a ground voltage level; and
   the first switching circuitry switchably couples the first electrical transmit signal to the input of the first optical signal source.

4. The optical cable system of claim 3, wherein:
   the first electrical receive signal is a differential electrical receive signal comprising a positive electrical receive signal and a negative electrical receive signal;
   the first electrical transmit signal is a differential electrical transmit signal comprising a positive electrical transmit signal and a negative electrical transmit signal;
   the first switching circuitry comprises a first switch configured to switchably couple the positive electrical transmit signal to a positive input of the first electrical-to-optical signal conversion circuitry and to switchably couple the negative electrical transmit signal to a negative input of the first electrical-to-optical signal conversion circuitry;
   the first resistance network comprises a first resistor having a first terminal and a second terminal and a second resistor having a first terminal and a second terminal, the first terminal of the first resistor coupled to the positive input of the first electrical-to-optical signal conversion circuitry and to the first switch, the second terminal of the first resistor coupled to the ground voltage level, the first terminal of the second resistor coupled to the negative input of the first electrical-to-optical signal conversion circuitry and to the second switch, the second terminal of the second resistor coupled to the ground voltage level.

5. The optical cable system of claim 1, wherein:
   the first resistance network has a first terminal coupled to the input of the first optical signal source and to a first terminal of the first resistance network; and
   the first switching circuitry switchably couples a second terminal of the first resistance network to a ground voltage level.

6. The optical cable system of claim 5, wherein:
   the first electrical receive signal is a differential electrical receive signal comprising a positive electrical receive signal and a negative electrical receive signal;
   the first electrical transmit signal is a differential electrical transmit signal comprising a positive electrical transmit signal and a negative electrical transmit signal;
   the first switching circuitry comprises a first switch and a second switch; and
   the first resistance network comprises a first resistor having a first terminal and a second terminal and a second resistor having a first terminal and a second terminal, the first terminal of the first resistor coupled to the positive input of the first electrical-to-optical signal conversion circuitry, the second terminal of the first resistor coupled to the first switch, the first terminal of the second resistor coupled to the negative input of first electrical-to-optical signal conversion circuitry, the second terminal of the second resistor coupled to the second switch, wherein the first switch is configured to switchably couple the second terminal of the first resistor to the ground voltage level, and the second switch is configured to switchably couple the second terminal of the second resistor to the ground voltage level.

7. The optical cable system of claim 2, further comprising:
   a second mateable electrical connector;
   second switching circuitry configured to switch a signal associated with a second electrical transmit signal received from the second mateable electrical connector;
   a second resistance network comprising at least one resistor coupled to the second switching circuitry and to a fixed voltage level, the second resistance network contributing to an impedance presented at a terminal of the second mateable electrical connector associated with the electrical transmit signal, the second switching circuitry switching the impedance in response to a second switching signal;
   second optical-to-electrical signal conversion circuitry configured to detect and convert a second optical receive signal received via the first optical fiber into a second electrical receive signal, configured to provide the second electrical receive signal to the second mateable electrical connector, and configured to produce the second switching signal in response to detecting the second optical receive signal; and
   second electrical-to-optical signal conversion circuitry having an input coupled to the second resistance network, the second electrical-to-optical signal conversion circuitry configured to convert the second electrical transmit signal into a second optical transmit signal and configured to provide the second optical transmit signal to the second optical fiber.

8. A method of operation in an optical cable system, the optical cable system comprising first switching circuitry, a first resistance network, first optical-to-electrical signal conversion circuitry, and first electrical-to-optical signal conversion circuitry, the method comprising:
the first electrical-to-optical signal conversion circuitry converting a first electrical transmit signal into a first optical transmit signal and providing the first optical transmit signal;
the first optical-to-electrical signal conversion circuitry detecting and converting a first optical receive signal into a first electrical receive signal, the first optical-to-electrical signal conversion circuitry further generating a first switching signal in response to detecting the first optical receive signal;
the first switching circuitry switching a first signal associated with the first electrical transmit signal in response to the first switching signal; and
switching the impedance presented at a terminal of the first mateable electrical connector associated with the first electrical transmit signal in response to switching of first switching circuitry, a first resistance network contributing to the impedance comprising at least one resistor coupled to the first switching circuitry and to a fixed voltage level.

9. The method of claim 8, wherein the optical cable system comprises a first mateable electrical connector configured to receive the first electrical transmit signal, a first optical fiber configured to convey the first optical transmit signal, and a second optical fiber configured to convey the first optical receive signal.

10. The method of claim 8, wherein switching a first signal associated with the first electrical transmit signal comprises connecting the first electrical transmit signal to a first terminal of the resistance network and to the input of the first electrical-to-optical signal conversion circuitry, a second terminal of the resistance network being coupled to a ground voltage level.

11. The method of claim 10, wherein:
the first electrical-to-optical signal conversion circuitry converting a first electrical transmit signal into a first optical transmit signal comprises converting a first differential electrical transmit comprising a positive electrical transmit signal and a negative electrical transmit signal into a first optical transmit signal;
the first optical-to-electrical signal conversion circuitry detecting and converting a first optical receive signal into a first electrical receive signal comprises detecting and converting a first optical receive signal into a first differential electrical receive signal comprising a positive electrical receive signal and a negative electrical receive signal;
the first switching circuitry switching a first signal associated with the first electrical transmit signal comprises a first switch coupling a positive electrical transmit signal to a positive input of the first optical signal source and coupling the negative electrical transmit signal to a negative input of the first optical signal source;
wherein the first resistance network comprises a first resistor having a first terminal and a second terminal and a second resistor having a first terminal and a second terminal, the first terminal of the first resistor coupled to the positive input of the first electrical-to-optical signal conversion circuitry and to the first switch, the second terminal of the first resistor coupled to the ground voltage level, the first terminal of the second resistor coupled to the negative input of the first electrical-to-optical signal conversion circuitry and to the second switch, the second terminal of the second resistor coupled to the ground voltage level.

12. The method of claim 8, wherein:
the first resistance network has a first terminal coupled to the input of the first electrical-to-optical signal conversion circuitry and to a first terminal of the first resistance network; and
switching a first signal associated with the first electrical transmit signal comprises connecting a second terminal of the first resistance network to a ground voltage level.

13. The method of claim 12, wherein:
the first electrical-to-optical converting a first electrical transmit signal into a first optical transmit signal comprises converting a first differential electrical transmit comprising a positive electrical transmit signal and a negative electrical transmit signal into a first optical transmit signal;
the first optical-to-electrical detecting and converting a first optical receive signal into a first electrical receive signal comprises detecting and converting a first optical receive signal into a first differential electrical receive signal comprising a positive electrical receive signal and a negative electrical receive signal;
wherein the first resistance network comprises a first resistor having a first terminal and a second terminal and a second resistor having a first terminal and a second terminal; and
switching a first signal associated with the first electrical transmit signal comprises a first switch coupling the second terminal of the first resistor to the ground voltage level, and a second switch coupling the second terminal of the second resistor to the ground voltage level.

14. The method of claim 9, wherein the optical cable system further comprises a second mateable electrical connector, second switching circuitry, a second resistance network, second optical-to-electrical signal conversion circuitry, and second electrical-to-optical signal conversion circuitry, the method further comprising:
the second electrical-to-optical signal conversion circuitry converting a second electrical transmit signal received via the second mateable electrical connector into a second optical transmit signal and providing the second optical transmit signal to the second optical fiber;
the second optical-to-electrical signal conversion circuitry detecting and converting a second optical receive signal received via the first optical fiber into a second electrical receive signal, and providing the second electrical receive signal to the second mateable electrical connector, the second optical-to-electrical signal conversion circuitry further generating a second switching signal in response to detecting the optical receive signal;
the second switching circuitry switching a second signal associated with the second electrical transmit signal in response to the second switching signal; and
a second resistance network comprising at least one resistor coupled to the second switching circuitry and to a fixed voltage level contributing to an impedance presented at a terminal of the second mateable electrical connector associated with the second electrical transmit signal, wherein the impedance presented at the terminal of the second mateable electrical connector switches in response to switching of the second switching circuitry.

15. The method of claim 13, further comprising:
mating the first mateable electrical connector with a mating electrical connector of a first electronic device; and
mating the second mateable electrical connector with a mating electrical connector of a second electronic device.

\* \* \* \* \*